United States Patent
Conta et al.

(10) Patent No.: US 6,371,591 B1
(45) Date of Patent: Apr. 16, 2002

(54) ALIGNMENT SYSTEM FOR MULTIPLE COLOR INK JET PRINTHEADS AND ASSOCIATED PRINTHEAD WITH BUILT-IN OPTICAL POSITION DETECTOR

(75) Inventors: Renato Conta, Ivrea; PierLuigi Soriani, Virgilio, both of (IT)

(73) Assignee: Olivetti Tecnost S.p.A., Ivrea (Torino) (IT)

(*) Notice: Subject to any disclaimer, the term of this patent is extended or adjusted under 35 U.S.C. 154(b) by 0 days.

(21) Appl. No.: 09/508,189
(22) PCT Filed: Sep. 22, 1998
(86) PCT No.: PCT/IT98/00251
 § 371 Date: Mar. 8, 2000
 § 102(e) Date: Mar. 8, 2000
(87) PCT Pub. No.: WO99/15338
 PCT Pub. Date: Apr. 1, 1999

(30) Foreign Application Priority Data

Sep. 24, 1997 (IT) .......................... TO97A0844

(51) Int. Cl.⁷ ................................. B41J 2/01
(52) U.S. Cl. .......................... 347/19; 347/67
(58) Field of Search ...................... 347/19, 56, 63, 347/67

(56) References Cited

U.S. PATENT DOCUMENTS 4,709,245 A   11/1987   Piatt
4,922,270 A   5/1990    Cobbs et al.
5,265,315 A * 11/1993   Hoisington et al. ........ 29/23.35
5,975,674 A * 11/1999   Beauchamp et al. .......... 347/19

FOREIGN PATENT DOCUMENTS

EP   0474021   3/1992
EP   0622239   11/1994
EP   0734877   10/1996
EP   0775587   5/1997

OTHER PUBLICATIONS

International Search Report for International Application No. PCT/IT 98/00251, mailed Jan. 22, 1999.

* cited by examiner

Primary Examiner—Craig A. Hallacher
(74) Attorney, Agent, or Firm—Banner & Witcoff, Ltd.

(57) ABSTRACT

The individual monochromatic printheads mounted simultaneously on the scanning carriage of an ink jet printer are provided with an opto-electronic position detector of the four-quadrant type, which is integrated directly in the chip of each head by means of the same MOS technology used for the circuits for selection and driving of the emission resistors; an illumination device fixed onto the printer focuses a light spot on the position detector which thus provides the electronic control unit of the printer with a measurement of both the vertical and horizontal misalignment of each head, a measurement which is subsequently used in order to compensate automatically for the misalignment thereof.

35 Claims, 5 Drawing Sheets

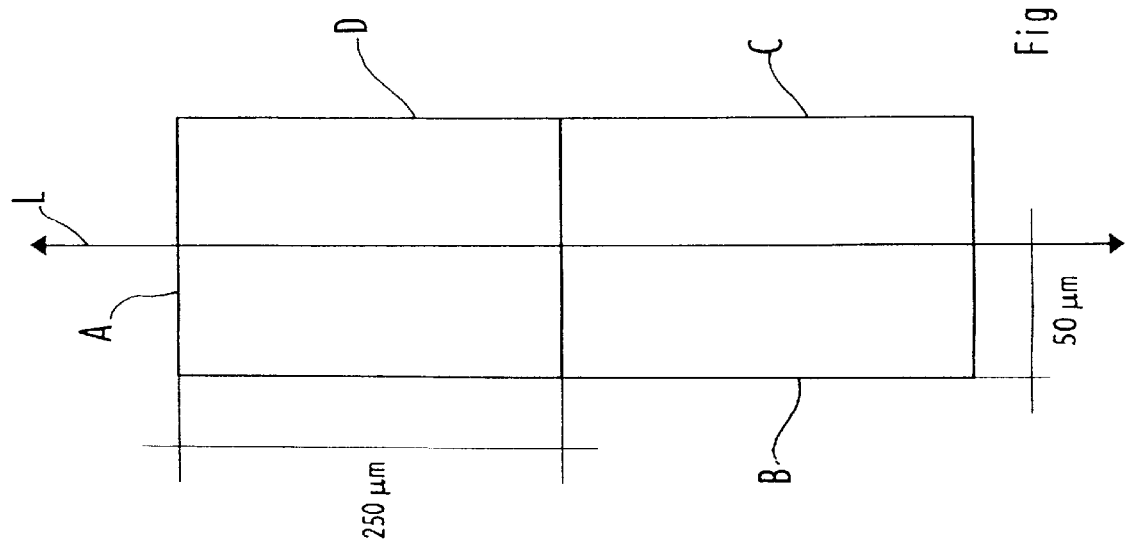

ALIGNMENT SYSTEM FOR MULTIPLE COLOR INK JET PRINTHEADS AND ASSOCIATED PRINTHEAD WITH BUILT-IN OPTICAL POSITION DETECTOR

TECHNICAL FIELD

The system refers to an alignment system for multiple colour ink jet printheads in a dot matrix printer comprising a fixed structure, a scanning carriage for supporting the printheads, which is movable with respect to the fixed structure in a first horizontal direction, and an electronic control unit comprising a function for timing the emission of ink droplets by the heads.

BACKGROUND ART

Colour ink jet printers both of the "thermal" type and of the "piezoelectric" type are widely known, said printers being provided with a plurality of monochromatic heads (typically three or four) which are physically and mechanically identical to one another, but contain different inks (typically corresponding to the primary colours blue, yellow and magenta, and in some cases black); each head has a large number of nozzles for emitting ink droplets (for example, three hundred, but the current trend of technology is towards even larger numbers) which are arranged at uniform intervals in one or more parallel rows, with a corresponding number of emission elements for producing the ink droplets which are selectively ejected through the nozzles.

As is known in the latest technology, ink jet printheads of the "thermal" type comprise a semiconductor (usually silicon) substrate or chip having, formed on it, using known technologies, both the components which more specifically relate to ink jet technology (the emission resistors) as well as the power drivers for driving them and the logic for selecting the individual emission resistor to be driven; for the first group of components normally thin-film technology is used, while for the second group LDMOS (lateral double diffused MOS) technology and for the third group CMOS technology are used, these latter technologies being used in the simplified version with the least number of process steps and masks, so as to satisfy only the functional requirements of the bubble ink jet heads.

The relative positioning precision of the nozzles with respect to one another on an individual head is very high, since the nozzle-carrying plate is made as one piece and the active part of the head is formed on a single silicon chip, all of which using micro photolithographic techniques which ensure a high degree of mechanical precision. The same cannot be said about the positioning precision with which the chip is assembled on the container body of the head, the latter being in turn mounted on the scanning carriage of the printer, such that final alignment of the nozzles on the various monochromatic heads (necessary for obtaining a good print quality, in particular in high definition mode, as is well known to those skilled in the art) may be obtained only by means of additional operations involving operational alignment of the heads, to be performed in a more or less automatic manner, directly on the printer, with consequent difficulties of a practical and cost-related nature.

DISCLOSURE OF THE INVENTION

The object of the present invention is that of defining a system for obtaining operational alignment, both in the horizontal direction (scanning direction) and vertical direction (interlinear feed direction), of the printheads of a colour ink jet printer having multiple monochromatic heads, with the necessary precision for high-quality high-definition colour printing.

The object of the present invention is obtained by the alignment system for multiple colour ink jet printheads and associated printhead with built-in optical position detector, characterized by the steps of providing printheads comprising a built-in opto-electronic position detector, for detecting a first misalignment of the heads in the first horizontal direction and a second misalignment of the heads in a second vertical direction, substantially perpendicular with respect to the first horizontal direction, the heads also comprising a plurality of nozzles arranged at uniform intervals in at least one row parallel to the second vertical direction; providing an illumination device integral with the fixed structure for producing a light spot focused on the opto-electronic detector; detecting the first misalignment and the second misalignment by means of the combined use of the built-in opto-electronic position detector and the illumination device; compensating for the first misalignment of the heads in the first horizontal direction, by means of a variation of the timing of the emission of ink droplets, and compensating for the second misalignment of the heads in the second vertical direction by means of a vertical displacement of the heads.

The system according to the invention is based on the availability of printheads comprising at least one opto-electronic device which forms an optical position detector of the four-quadrant type, integrated on the chip itself of the head, i.e. manufactured during the course of the same production process, using standardized technologies for the production of integrated semiconductor circuits, with which, based on the common silicon substrate, the other components necessary for operation of the head itself, such as the emission resistors, the selection circuits, the drivers and the connection conductors, are made.

In this way the integrated opto-electronic device forms an optical position detector which is aligned with the nozzles with photolithographic precision and by means of which it is possible to detect automatically both the horizontal position and the vertical position of each individual monochromatic head mounted on the scanning carriage; the system according to the invention uses the position detection operations thus performed in order to make the appropriate corrections needed to compensate for the geometric alignment errors detected, by means of the electronic control unit of the printer.

The horizontal alignment errors are corrected by suitably delaying or advancing the timing of emission of the ink droplets by the various monochromatic printheads with respect to the instant determined on the basis of the theoretical position of the head itself and the speed of displacement of the carriage; the vertical alignments errors are corrected, on the other hand, by suitably modifying the physical position of the heads (for example, by vertically displacing the head by a suitable amount by means of a piezoelectric micromotor) or else (assuming a maximum misalignment one half pitch) by dispensing with use of the nozzles of each head located outside a common alignment band.

Another object of the present invention is that of defining a system for adjusting both the horizontal and vertical mechanical alignment of the seats supporting the printheads of an ink jet colour printer having multiple heads, with the precision necessary for high-definition colour printing, during testing of the printer itself or during a maintenance operation, using a sample printhead.

A further object of the invention is that of defining a system for adjusting both the horizontal and vertical mechanical alignment of the chip+flat cable assembly subgroup with respect to the container of a printhead for a colour ink jet printer having multiple heads, during construction of the head itself.

Another object of the invention is that of defining a system for adjusting both the horizontal and vertical mechanical alignment, relative to one other, of two or more chips which make up a multiple printhead (able to print in a single pass a strip with a height typically greater than one inch) for particular applications (for example, postal franking).

Another object of the invention is that of defining a printhead provided with an optical position detector integrated on the same semi-conductor chip and using the same technologies used to manufacture the emission elements and the logic and power circuitry.

The abovementioned objects are achieved by means of a system for operational alignment of the monochromatic printheads of a colour ink jet printer provided with multiple heads, and by means of a printhead with a built-in optical position detector, which are characterized as defined in the main claims.

These and other objects, characteristic features and advantages of the invention will emerge clearly from the following description of a preferred embodiment thereof, provided by way of a non-limiting example, with reference to the accompanying drawings.

BRIEF DESCRIPTION OF THE DRAWINGS

FIG. 3a shows in schematic form a plan view of the sensitive area of the opto-electronic device according to FIG. 1;

FIG. 3b shows in schematic form a plan view of the sensitive area of the opto-electronic device according to FIG. 1, with the addition of a calibration phototransistor;

FIG. 5b shows in diagrammatic form the pattern of the difference ($V_A-V_B$) of the voltages $V_A$ and $V_B$ shown in FIG. 5a.

BEST MODE FOR CARRYING OUT THE INVENTION

The alignment system according to the invention, which is intended to obtain both the horizontal and vertical operational alignment of the printheads of a colour ink jet printer having multiple monochromatic heads mounted on the scanning carriage with the necessary precision for high-definition colour printing, requires the availability, in addition to that which is normally present in a similar printer according to the known art, of:

a) printheads provided with a four-quadrant optical position detector which is built-in, i.e. manufactured during the course of the same production process, using standardized technologies for the production of integrated semiconductor circuits, with which, based on the common silicon substrate, the other components necessary for operation of the head itself, such as the emission resistors, selection circuits, drivers and connection conductors, are made;

b) an illumination device fixed onto the printer;

c) a device for performing vertical displacement of the printheads;

d) an electronic control unit able to process the signals produced by the optical position detector and to modulate timing of the emission of the ink droplets according to the signals thus processed;

in which the characteristic features which are of importance for the purposes of the present invention will be described in more detail below.

Figure 1:
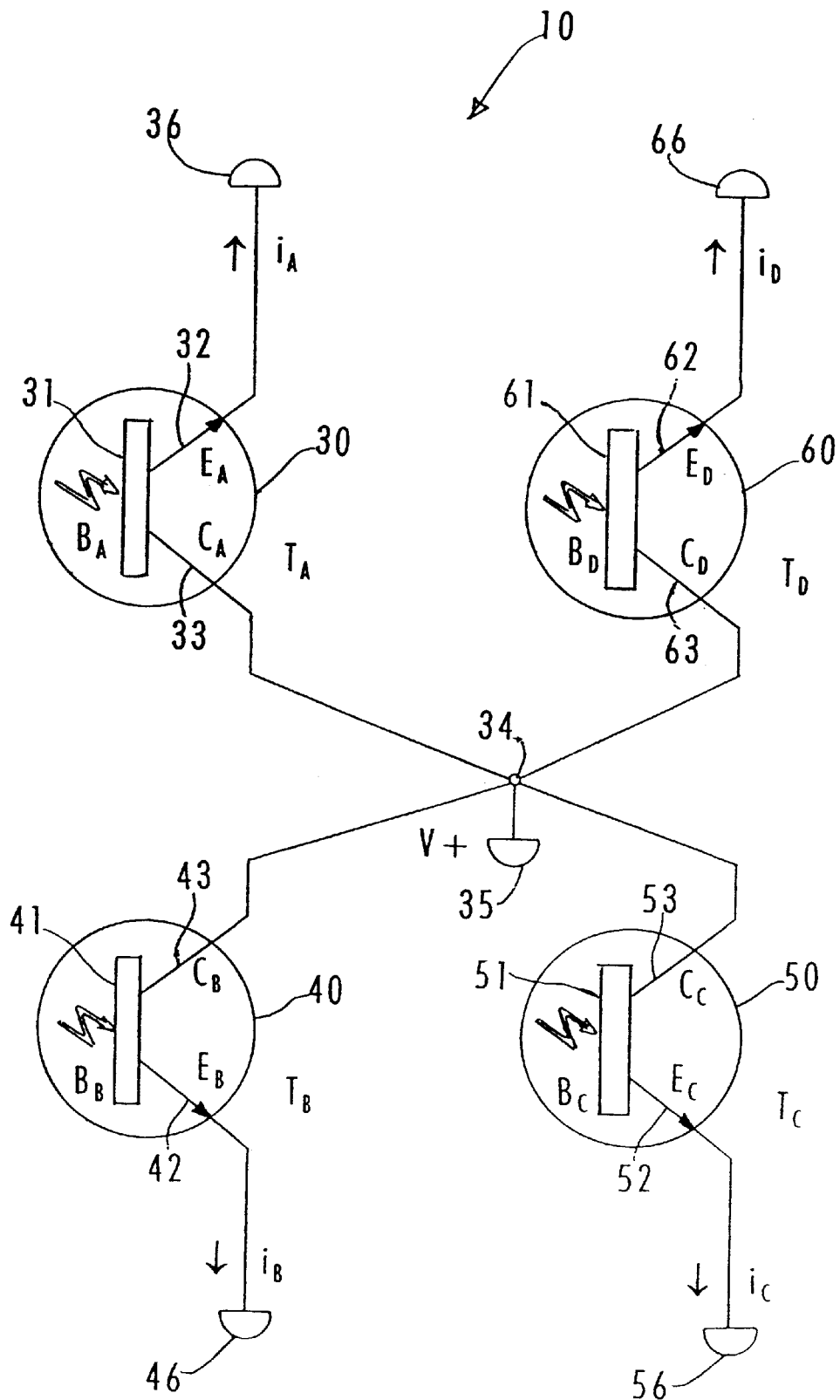
FIG. 1 shows the simplified electrical diagram of the opto-electronic device integrated on the chip of the printhead according to the invention in order to detect alignment thereof.

Printhead—The printhead according to the invention is an ink jet head of the multiple-nozzle thermal type, with selection and driver circuits manufactured using CMOS and LDMOS technology and droplet generating components manufactured using thin-film technology and integrated on a single support (semiconductor substrate or chip), of the type known in the art, which also comprises an opto-electronic device 10, the electrical diagram of which is shown in FIG. 1 and which forms a position detector of the four-quadrant type which is also integrated on the same support and manufactured using the same semiconductor integrated-circuit technologies mentioned above.

From the electrical point of view, the opto-electronic device 10 consists of four phototransistors $T_A$, $T_B$, $T_C$ and $T_D$ which are identified respectively by the numbers 30, 40, 50 and 60 and which have open bases $B_A$, $B_B$, $B_C$ and $B_D$ which are identified respectively by the numbers 31, 41, 51 and 61; common collectors $C_A$, $C_B$, $C_C$ and $C_D$ which are identified respectively by the numbers 33, 43, 53 and 63 and connected electrically to one another at a common node 34 from where they receive a power supply of +35V; and independent emitters $E_A$, $E_B$, $E_C$ and $E_D$ identified respectively by the numbers 32, 42, 52 and 62.

The photocurrents $i_A$, $i_B$, $i_C$ and $i_D$, generated by the phototransistors $T_A$ 30, $T_B$ 40, $T_C$ 50 and $T_D$ 60 on the corresponding emitters $E_A$ 32, $E_B$ 42, $E_C$ 52 and $E_D$ 62 when the associated bases are suitably illuminated, are individually collected by four separate amplifiers known per se, not shown in the figures, which are preferably integrated on the same chip as the head and which produce by way of response four output voltage signals $V_A$, $V_B$, $V_C$ and $V_D$ which are proportional to the individual photocurrents $i_A$, $i_B$, $i_C$ and $i_D$ and of a suitable level (for example, variable between 0 and +5 V). The voltage signals $V_A$, $V_B$, $V_C$ and $V_D$ output by the amplifiers are input to standardized electronic circuits (for example, differential amplifiers and comparators) which are in turn also preferably integrated on the same chip as the head, but which functionally form part of the electronic control unit of the printer, for subsequent processing thereof The physical structure of the opto-electronic device 10 is shown schematically in FIG. 2 by means of a cross-sectional view which shows a single pair of phototransistors (for example $T_A$ 30 and $T_D$ 60). The pair of vertical phototransistors $T_A$ 30 and $T_D$ 60 is formed by the N+ zones representing the collectors 33 and 63 connected to a common output 34, by the P-type bodies 31 and 61 representing the open bases and by the N-type layers 32 and 62 representing the emitters. Said pair is delimited by an N-type well 21 which is formed by means of diffusion on a P-type silicon substrate 20 in a zone of the latter not protected by an $SiO_2$ field oxide (Locos—local oxidation of the silicon substrate) layer 25; the opto-electronic device 10 is then protected by a protective passivation layer 26 (BPSG—boron/phosphorus siliceous glassification), except for the areas where the metal layers which form the output conductors 34 for the collectors, and 36, 66 for the emitters, are deposited.

Figure 2:
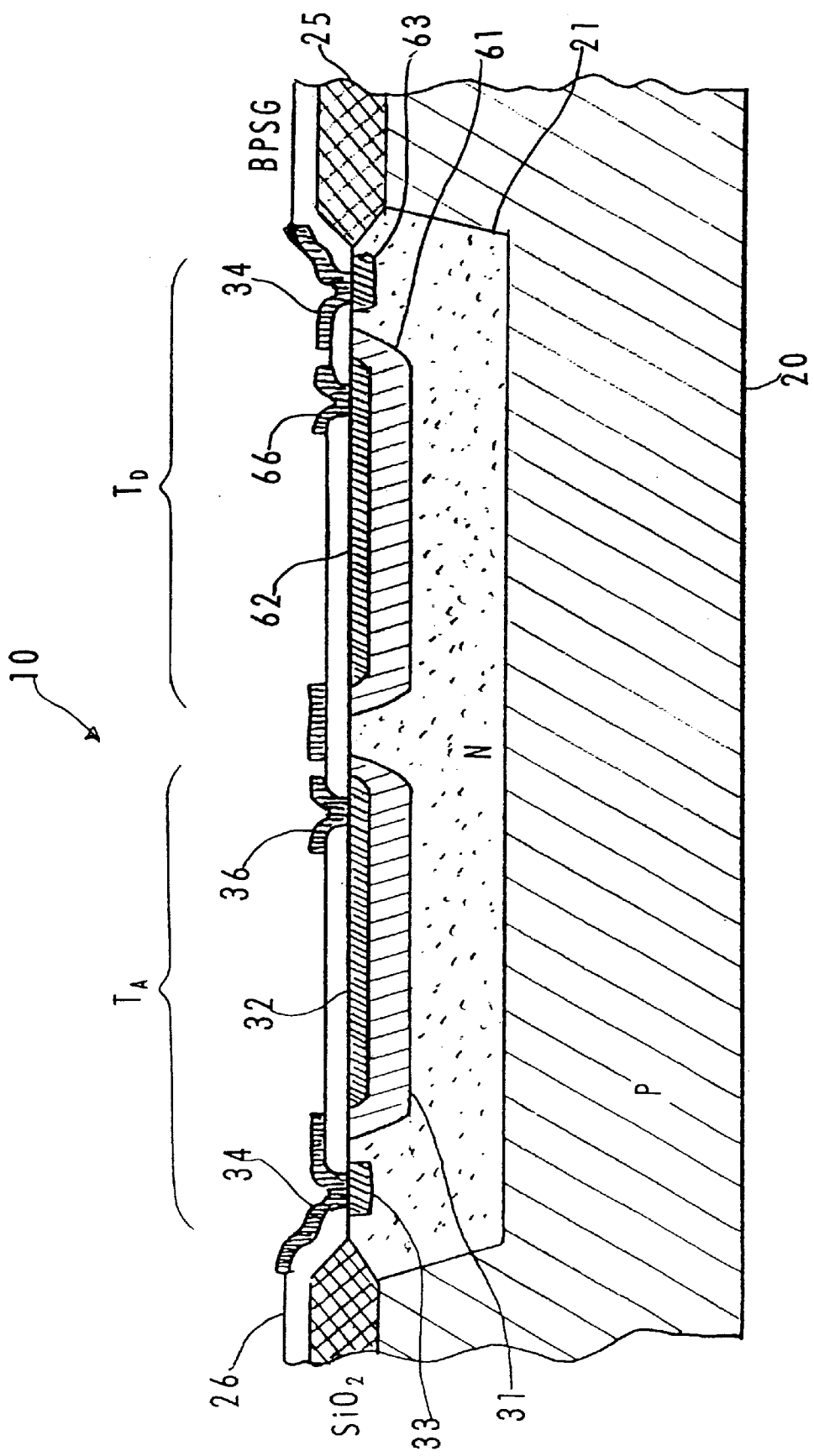
FIG. 2 shows in schematic form a cross-sectional view of the opto-electronic device according to FIG. 1.

The other two vertical phototransistors $T_B$ 40 and $T_C$ 50 of the opto-electronic device 10 of FIG. 1, with common collector and open base identical and adjacent to those described above, are integrated on the substrate 20 in the direction perpendicular to the plane of FIG. 2 so as to form overall an optical position detector with four quadrants.

The geometrical configuration of the active areas of the vertical phototransistors $T_A$ 30, $T_B$ 40, $T_C$ 50 and $T_D$ 60 forming the opto-electronic device 10 is represented by means of the plan view of FIG. 3a; the four quadrants consist of the photosensitive areas A, B, C and D corresponding to the open bases $B_A$ 31, $B_B$ 41, $B_C$ 51 and $B_D$ 61, and each of the photosensitive areas A, B, C and D has, by way of example, a rectangular shape, the dimensions of which are preferably comprised within the following limits:

height 100–500 μm
width 10–200 μm

Moreover, the photosensitive areas A and B, and C and D, respectively, are adjacent to one another along the smaller dimension and, in turn, facing one another along the larger dimension following a vertical straight line L so as to form overall a single rectangle in which the individual photosensitive areas are arranged in succession in the clockwise direction in the order A→B→C→D and the straight line L represents the axis of vertical symmetry. By way of example, if the individual areas A, B, C and D have a dimension of 250×50 μm, said single rectangle has dimensions of 500× 100 μm.

According to a variant of the invention, the opto-electronic device 10, in addition to the vertical phototransistors $T_A$ 30, $T_B$ 40, $T_C$ 50 and $T_D$ 60 also comprises a calibration phototransistor, the function of which will be described below and which is made using the same technology described above, with a photosensitive area E of rectangular shape which is aligned with the photosensitive areas A, B, C and D with the larger side (height) parallel to the vertical straight line L, as shown in FIG. 3b, and with a dimension equal to twice the height of the photosensitive areas A, B, C or D, and with the smaller side of equal width.

By way of example, the values of the doping operations and the thicknesses of the corresponding layers used to produce the device 10, which are typical of CMOS/LDMOS technology, are as follows:

| N+ emitter: | $> 10^{20}$ cm$^{-3}$; | xj = 0.5 μm, |
|---|---|---|
| P body: | $\approx 1 \times 10^{17}$ cm$^{-3}$; | xj = 1.5 μm, |
| N well: | $\approx 1 \times 10^{16}$ cm$^{-3}$; | xj = 4.5 μm, |
| P substrate: | $\approx 1 \times 10^{15}$ cm$^{-3}$. | |

It should be pointed out that the opto-electronic device 10 thus obtained is not optimized compared to solutions aimed at obtaining the best characteristics (for example, response in terms of frequency, noise, sensitivity, etc.), but it nevertheless has good functional characteristics and is obtained in particular using the same process steps and the same masks which in any case are necessary for manufacture of an integrated "thermal" ink jet head, i.e. without an increase in costs and difficulties compared to the known heads. Moreover, with the process described it is possible to achieve optimum reproducibility of the photoelectric characteristics of the vertical phototransistors $T_A$ 30, $T_B$ 40, $T_C$ 50 and $T_C$ 60, since they depend essentially on doping of the P body 21 and the P body/N well junction, such that dispersion of the values of the emitter photocurrent among the various phototransistors integrated on the same chip is less than ±2%, while the dispersion of the emitter photocurrent among the opto-electronic devices 10 integrated on various chips is limited to within ±10% in the case where doping of the N and P areas is performed by means of ion implantation with doping control better than ±5%.

But the main advantage obtained from having the opto-electronic device 10 integrated on the chip of the head is the high degree of precision with which the device itself is positioned with respect to the nozzles since the whole assembly is formed on a single silicon substrate, using micro-lithophotography techniques which ensure considerable mechanical precision, so as to form an optical position detector which is optimized for its intended use.

Figure 4A:
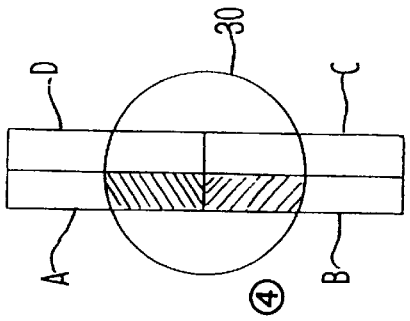
FIGS. 4a–4g show in schematic form seven different positions of the photosensitive area of the opto-electronic device according to FIG. 1 with respect to the light spot of the light beam focused by an illumination device.
Figure 4B:
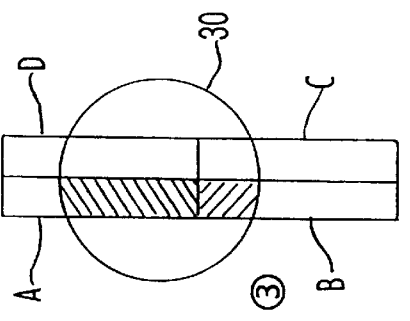
Figure 4C:
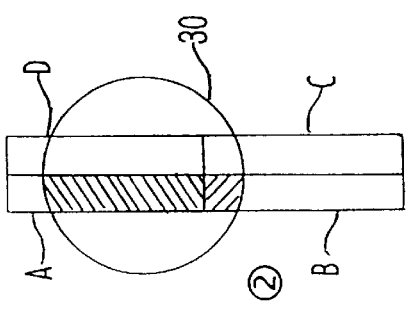
Figure 4D:
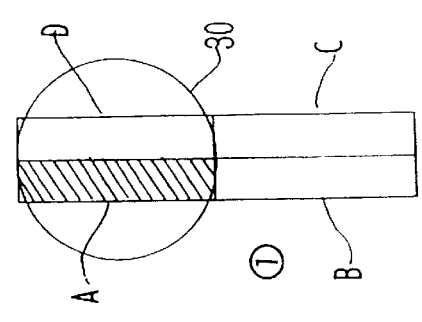
Figure 4E:
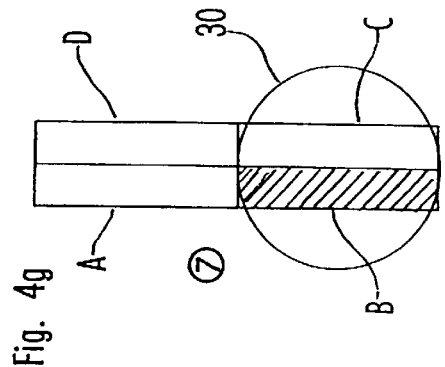
Figure 4F:
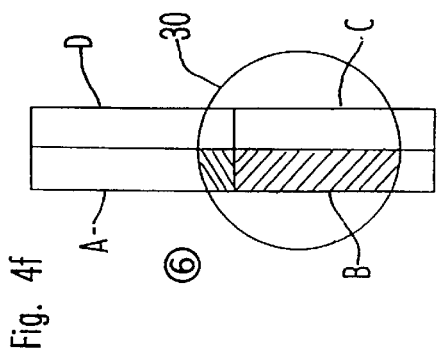
Figure 4G:
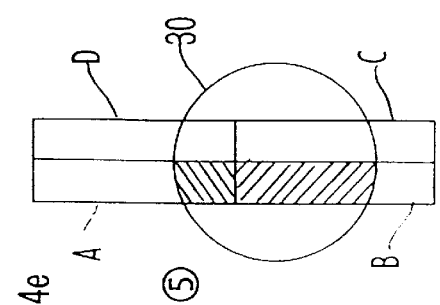

Illumination device. This consists of a fight source, typically an infrared fight-emitting diode (LED) or a laser diode, which are known per se, with emission on a wavelength band centred on about 900 nm, typically an illumination device of this type provides a luminous intensity of about 0.25 mW at 800 nm with an electric power consumption of about 10 mW. Using a known lens system (for example, a "Multielement collimating lens", produced by Optima Precision Inc. USA) and a suitable circular diaphragm, one obtains a circular light point or spot 30 (FIG. 4a) with a diameter of 250 μm focused at a distance of 7–8 mm from the source and having a uniform illumination intensity over the whole circular area 30 of about 20 mW/cm$^2$.

The illumination device (not shown in any of the figures since it does not possess any inventive character and can be easily duplicated by those skilled in the sector art) is attached to a fixed element (for example the structure) of the printer in a position so as to project the circular light spot 30 onto optoelectronic devices 10 which are integrated on the chips of the individual printheads mounted on the scanning carriage of the printer, when the latter, during its travel movement, is located in a given position, as shown in FIGS. 4a–4g.

With the abovementioned illumination intensity value indicated above, each of the vertical phototransistors $T_A$ 30, $T_B$ 40, $T_C$ 50 e $T_D$ 60 forming the opto-electronic device 10 (assuming, as typical values for an NPN vertical transistor produced with CMOS/LDMOS technology, a quantic efficiency of 50% in the wavelength range of 700–800 nm and a gain β=40–50), generates a maximum emitter photocurrent (proportional to the illuminated photosensitive area, the light intensity being uniform) of about 200 μA and a dark current of 10–50 nA.

Device for performing vertical displacement. According to a preferred embodiment of the invention, this consists of a piezoelectric type motor, known per se, which is capable of converting an input voltage directly into a linear displacement of one of its components (automatic device); according to an alternative embodiment of the invention, it advantageously consists, for example, of an eccentric cam, as is well known in mechanics (manual device).

Electronic control unit. This typically comprises a microprocessor, which is known per se, and at least one read only memory (ROM) of the known type, the function of which will be explained in greater detail below, and is characterized by the fact that it comprises the amplifiers of the emitter photocurrents $i_A$, $i_B$, $i_C$ and $i_D$ for generating the voltage signals $V_A$, $V_B$, $V_C$ and $V_D$ mentioned above, operational amplifiers for determining the difference between two signals and comparators for comparing two signals, all of which are standardized electronic circuits which are known per se.

The method with which the opto-electronic device 10 is used for measurement of the vertical alignment of a head according to the invention will now be described with reference to FIGS. 4a–4g, under the (non-limiting) assumption that the vertical misalignment of the head with respect to the theoretical position is limited to within ±125 μm, and that each of the photosensitive areas A, B, C and D has a rectangular shape of dimensions 250×50 μm. FIGS. 4a–4g show by way of example some of the possible relative positions of the circular light spot 30 and the photosensitive areas A, B, C and D at the instant when the head, transported by the scanning carriage, passes exactly opposite the circular light spot 30 (and hence the centre of the circle 30 corresponds with the vertical fine L which separates the areas A and B respectively from the areas D and C, shown in FIG. 3a).

Taking into account the relationship between the dimensions of the circular fight spot 30 and that of the photosensitive areas A, B, C and D mentioned above, it can be readily seen that the position of the circular fight spot 30 with respect to the photosensitive areas A, B, C and D of the opto-electronic device 10 integrated in the head will vary between a condition where there is total overlapping and a position where there is no overlapping. FIGS. 4a–4g show by way of example seven different conditions (1̂–7̂ lying between these two extremes, the condition 4̂ (FIG. 4d) being the theoretical one of vertical alignment, in which the centre of the circle 30 coincides exactly with the centre of the rectangle formed by the set of photosensitive areas A, B, C and D according to FIG. 3a.

Figure 5A:
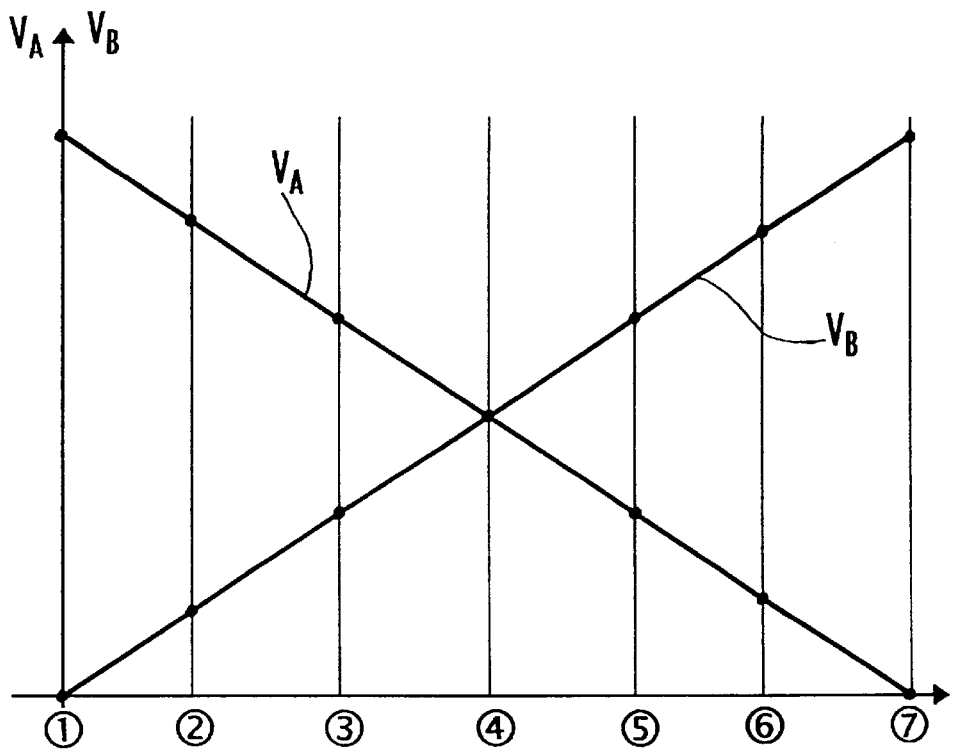
FIG. 5a shows in diagrammatic form the pattern of the voltages $V_A$ and $V_B$ obtained from the emitter photocurrents of the two phototransistors $T_A$ and $T_B$ in the seven positions of the photosensitive area of the opto-electronic device of FIG. 1 with respect to the light spot of the light ray focused by an illumination device shown in FIGS. 4a–4g.
Figure 5B:
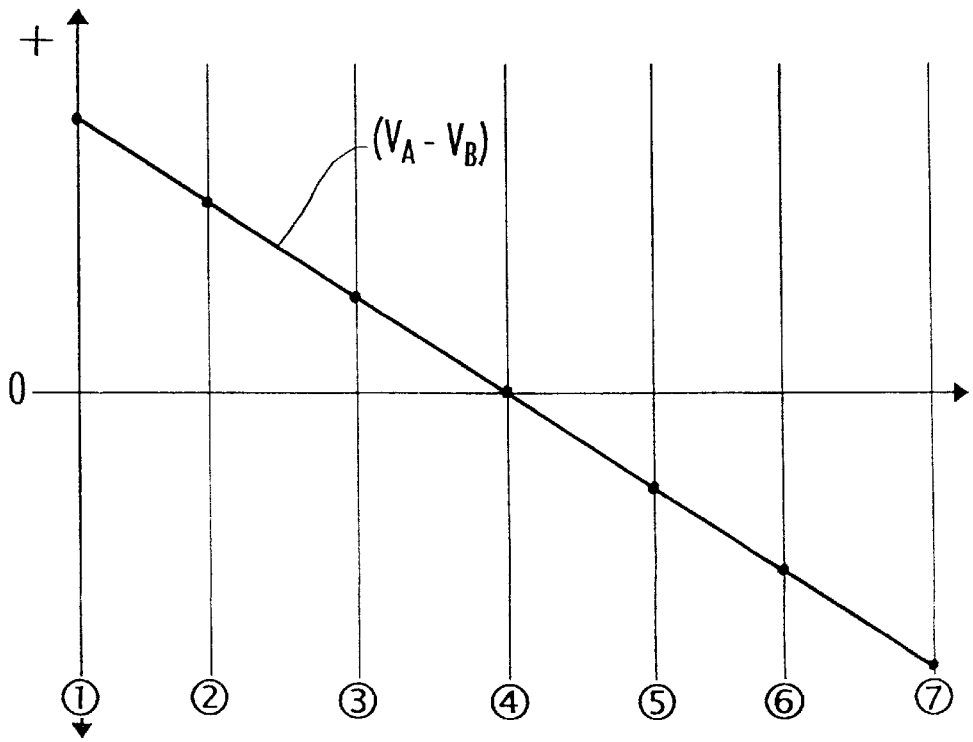

For detection of the vertical alignment it is sufficient to use a single pair of phototransistors of the opto-electronic device 10, for example the pair $T_A$ 30 and $T_B$ 40. Indicating with $V_A$ and $V_B$ respectively the output voltages from the abovementioned amplification circuits, connected to the emitters of the phototransistors $T_A$ 30 and $T_B$ 40 with the corresponding photosensitive areas A and B, FIG. 5a shows in schematic form the pattern of the values of $V_A$ and $V_B$ in each of the conditions 1̂–7̂ of FIGS. 4a–4g, while FIG. 5b shows in schematic form the pattern of the values of the difference $(V_A-V_B)$ again in each of the conditions (1̂–7̂ of FIGS. 4a–4g. It can be readily observed that the values of the difference $(V_A-V_B)$, at the instant when the centre of the circular area 30 corresponds with the vertical line L which separates the areas A and B respectively from the areas D and C, represent the vertical misalignment of the head with respect to the theoretical position, whereby $$(V_A-V_B)=0 \tag{1}$$

is the theoretical condition of perfect alignment.

The method with which the optoelectronic device 10 is used to determine the condition of horizontal alignment between the centre of the circular light spot 30 and the vertical line L which separates the areas A, B respectively from the areas C, D—mentioned above as being a necessary condition for performing the measurement of the vertical alignment of a head according to the invention—will now be described.

In order to determine whether this condition has occurred it is necessary to use all four vertical phototransistors $T_A$ 30, $T_B$ 40, $T_C$ 50 and $T_D$ 60 which form the opto-electronic device 10, comparing with one another the pairs of signals $V_A$, $V_D$ and $V_B$, $V_C$, it can be immediately understood, also on the basis of FIGS. 4a–4g, that the condition where the centre of the circle 30 coincides with the vertical line L which separates the areas A and B respectively from the areas D and C corresponds to the simultaneous occurrence of the two conditions $$(V_A=V_D) \text{ and } (V_B=V_C), \tag{2}$$

excluding the condition $$V_A=V_D=V_B=V_C=0 \tag{3}$$

which means that the phototransistors $T_A$30, $T_B$40, $T_C$ 50 and $T_D$ 60 are not illuminated.

The electronic control unit of the printer is able to verify, using means which are known to those skilled in the sector art, the presence of these conditions and hence perform correctly also the measurement of the vertical alignment.

It is now possible to describe the alignment system for multiple colour ink jet printheads according to the invention, containing, respectively, for example, a black ink, a blue ink, a yellow ink and a magenta ink and mounted on the scanning carriage of a printer, which is in turn provided with the illumination device, the device for performing vertical displacement of the printheads and the electronic control unit which are described above.

Said alignment system substantially comprises the following steps:

a first step consisting of detection of the horizontal misalignment of each head;

a second step consisting of detection of the vertical misalignment of each head;

a third step consisting of correction of the timing of the emission of the droplets by each individual head, so as to compensate for the horizontal misalignment detected during the first step;

a fourth step consisting of correction of the vertical position of each individual head, detected during the second step.

First step. The detection of the horizontal misalignment of a head with respect to the theoretical position involves the measurement of the temporal deviation between the instant to in which the head itself; transported by the scanning carriage, passes exactly opposite the circular light spot 30 (and hence the centre of the circle 30 corresponds with the vertical line L which separates the areas A and B respectively from the areas D and C, shown in FIG. 3a), and the predetermined theoretical instant to in which the event should occur.

Said deviation will have a plus sign and value equal to $\Delta t_A$, in the case where the head is horizontally displaced in the carriage scanning direction with respect to the theoretical position which it should occupy (namely it arrives in advance); and will have a minus sign and value equal to $\Delta t_R$, in the case where the head is horizontally displaced in the opposite direction to the carriage scanning direction with respect to the theoretical position which it should occupy (namely it arrives with a delay).

This measurement is performed by the electronic control unit of the printer using methods which are well known to those skilled in the sector art, for example, counting how many pulses emitted by an oscillator of known frequency are contained between the theoretical instant $t_0$, calculated on the basis of the position in which the illumination device is fixed, and the actual instant $t_1$ in which the said condition of horizontal alignment occurs.

Second step. The detection of the vertical alignment of a head with respect to its theoretical position involves the measurement of the value of the difference $(V_A-V_B)$ in the horizontal alignment condition, i.e. in the instant $t_1$, detected during the first step.

Third step. The correction of the timing of the emission of the droplets is performed by the electronic control unit of the printer delaying, with respect to the theoretically determined instant $t_0$, the emission of the ink droplets by the heads which are horizontally displaced in the opposite direction to the carriage scanning direction with respect to the theoretical position which they should occupy, by a time period equal to $\Delta t_R$; and by advancing, again with respect to the theoretically determined instant, the emission of the ink droplets by the heads which are horizontally displaced in the carriage scanning direction with respect to the theoretical direction which they should occupy, by a time period to $\Delta t_A$.

Fourth step. The correction of the vertical position is performed by the electronic control unit of the printer for the heads which, on the basis of the detection performed during the second step, are vertically misaligned, in accordance with a preferred embodiment of the present invention, by means of suitable operation of a piezoelectric motor so as to displace them vertically downwards or upwards. Determination of the exact degree of the displacement to be performed is effected by the electronic control unit of the printer on the basis of a "look-up table" for carrying out conversion between the values of the difference $(V_A-V_B)$ and the microns of misalignment which they represent, which is stored, for example, in a ROM and predefined on the basis of the known characteristics (geometric, optical and electrical) of the components involved in the measurement (optical device, illumination device, amplifiers, etc.).

Obviously it is possible to make modifications and additions to the invention described above, without thereby departing from the protective scope thereof For example, correction of the vertical position, corresponding to the fourth step of the alignment system according to the invention, may be performed by means of suitable operation by an operator of an eccentric cam so as to displace vertically downwards or upwards the head by a certain amount, via subsequent adjustments determined on the basis of an indication of the result obtained, which is displaced by the electronic control unit of the printer.

Or else it is possible, by way of an alternative to correction of the vertical position and assuming that, even with a vertical displacement of half a pitch, an acceptable print quality is nevertheless obtained, to shift the driving of the nozzles by one or more places along the nozzle array. In this way it is possible, for example, to dispense with use of the nozzles of each head which are located outside a common horizontal band. In particular, in the case of a pitch between the nozzles equal to 1/600 of an inch ($\approx 42$ μm), still assuming a maximum vertical misalignment between the heads of ±125 μm, in the worst case, the use of six nozzles could be dispensed with.

Moreover it is possible to carry out an additional function, consisting of the possibility of automatically calibrating the luminous intensity of the circular spot 30 according to the sensitivity of the phototransistors so as to obtain values of the emitter photocurrents $i_A$, $i_B$, $i_C$ and $i_D$ which are constant from head to head; this requires the integration of a calibration photosensor $T_E$ with a photosensitive area E (see FIG. 3b) having a height equal to at least the value of the assumed maximum misalignment, for example 500 μm. The electric power supplied to the light source of the illumination device is adjusted automatically so as to obtain a predetermined value for the maximum emitter photocurrent $i_E$ of the calibration photosensor $T_E$, and this adjustment is then maintained for the subsequent head alignment detection step described above.

Finally, it is possible to use the optoelectronic device 10 integrated on the chip of the head, by means of obvious modifications of the system described, for adjustments in alignment during processing steps within the process for production of the head itself or the printer, such as for example:

adjusting both the horizontal and vertical mechanical alignment of the support seats of the printheads on the scanning carriage of a colour ink jet printer provided with multiple heads, during testing of the printer itself or during a maintenance operation, using a sample printhead, or:

adjusting both the horizontal and vertical mechanical alignment of the chip+flat cable assembly subgroup with respect to the container of a printhead, during construction of the head itself, or also adjusting both the horizontal and vertical mechanical alignment, relative to one another, of the two or more chips which form a multiple printhead (able to print in a single pass a strip with a height typically greater than one inch) for particular applications (for example, postal franking).

In short, without prejudice to the principle of the present invention, the constructional details and the embodiments may be greatly varied with respect to that described and illustrated, without departing from the scope of the invention itself.

What is claimed is:

1. Alignment system for multiple colour ink jet printheads in a dot matrix printer, said printer comprising a fixed structure; a scanning carriage for supporting said heads, which is movable with respect to said fixed structure in a first horizontal direction; and an electronic control unit comprising a function for timing the emission of ink droplets by said heads, characterized in that said alignment system comprises the steps of:

providing printheads comprising a built-in optoelectronic position detector, for detecting a first misalignment of said heads in said first horizontal direction and a second misalignment of said heads in a second vertical direction, substantially perpendicular with respect to said first horizontal direction, said heads also comprising a plurality of nozzles arranged at uniform intervals in at least one row parallel to said second vertical direction;

providing an illumination device integral with said fixed structure for producing a light spot focused on said opto-electronic detector;

detecting said first misalignment and said second misalignment by means of the combined use of said built-in optoelectronic position detector and said illumination device;

compensating for said first misalignment of said heads in said first horizontal direction, by means of a variation of said timing of said emission of ink droplets; and compensating for said second misalignment of said heads in said second vertical direction by means of a vertical displacement of said heads.

2. Alignment system according to claim 1, characterized in that said vertical displacement of said heads is performed by means of piezoelectric motors.

3. Alignment system according to claim 1, characterized in that said vertical displacement of said heads is performed by means of rotation of eccentric cams.

4. Alignment system according to claim 1, characterized in that said second misalignment of said heads in said second vertical direction is corrected by shifting the driving of the nozzles by one or more places along the nozzle array.

5. Alignment system according to claim 1, characterized in that said built-in opto-electronic position detector is of the four-quadrant type.

6. Alignment system according to claim 5, characterized in that said built-in opto-electronic position detector comprises four vertical phototransistors with an open base and common collector, each having an independent emitter.

7. Alignment system according to claim 6, characterized in that said built-in opto-electronic position detector also comprises a vertical calibration phototransistor.

8. Alignment system according to claim 6, characterized in that said four vertical phototransistors are substantially identical to one another.

9. Alignment system according to claim 8, characterized in that said open base has a photosensitive surface in the form of a rectangle with a larger side parallel to said second vertical direction and with a smaller side parallel to said first horizontal direction.

10. Alignment system according to claim 9, characterized in that said larger side has dimensions of between 100 and 500 $\mu$m and said smaller side has dimensions of between 10 and 200 $\mu$m.

11. Alignment system according to claim 8, characterized in that said first misalignment of said heads in said first horizontal direction is detected by means of checking for a condition of equality of the photocurrents from said independent emitters of said four vertical phototransistors.

12. Alignment system according to claim 8, characterized in that said misalignment of said heads in said vertical direction is detected by means of checking for a condition of equality of the photocurrents from said independent emitters of only two of said four vertical phototransistors.

13. Alignment system according to claim 1, characterized in that said illumination device comprises a light generating device chosen from the group composed of laser diodes and light emitting diodes (LED's).

14. Alignment system according to claim 1, characterized in that said illumination device comprises a lens system for focusing said light spot on said built-in opto-electronic position detector.

15. Alignment system according to claim 14, characterized in that said illumination device also comprises a circular diaphragm.

16. Alignment system according to claim 1, characterized in that said multiple printheads are four in number and contain respectively a black ink, a blue ink, a yellow ink and a magenta ink.

17. Alignment system for multiple colour ink jet printheads in a dot matrix printer, said printer comprising a fixed structure, a scanning carriage for supporting said heads, which is movable with respect to said fixed structure in a first horizontal direction; and an electronic control unit comprising a function for timing the emission of ink droplets by said heads, characterized in that said alignment system comprises the steps of:

providing printheads comprising a built-in opto-electronic position detector, for detecting a first misalignment of said heads in said first horizontal direction and a second misalignment of said heads in a second vertical direction, substantially perpendicular with respect to said first horizontal direction, said heads also comprising a plurality of nozzles arranged at uniform intervals in at least one row parallel to said second vertical direction;

providing an illumination device integral with said fixed structure for producing a light spot focused on said optoelectronic detector, detecting said first misalignment and said second misalignment by means of the combined use of said built-in opto-electronic position detector and said illumination device;

compensating for said first misalignment of said heads in said first horizontal direction, by means of a variation of said timing of said emission of ink droplets; and compensating for said second misalignment of said heads in said second vertical direction by means of the selective non-use of some of said plurality of nozzles.

18. Alignment system according to claim 17, characterized in that said built-in opto-electronic position detector is of the four-quadrant type.

19. Alignment system according to claim 18, characterized in that said built-in opto-electronic position detector comprises four vertical transistors with an open base and common collector, each having an independent emitter.

20. Bubble ink jet printhead comprising:

a semiconductor substrate;

a first plurality of emission elements integrated on said substrate, for producing ink droplets through a corresponding plurality of nozzles which are arranged at uniform intervals in at least one row in a first vertical direction;

a second plurality of electronic components integrated on said substrate by means of MOS technology for selectively and driving said first plurality of emission elements, characterized in that it also comprises an opto-electronic position detector of the four-quadrant type, integrated on said substrate by means of said MOS technology, said opto-electronic position detector being provided for cooperating with an external illumination device.

21. Printhead according to claim 20, characterized in that said substrate is silicon and said MOS technology is chosen from a group consisting of CMOS technology and LDMOS technology.

22. Printhead according to claim 20, characterized in that said built-in opto-electronic position detector comprises four vertical phototransistors with an open base and common collector, each having an independent emitter.

23. Printhead according to claim 22, characterized in that said built-in opto-electronic position detector also comprises a vertical calibration phototransistor.

24. Printhead according to claim 22, characterized in that said four vertical phototransistors are substantially identical to each other.

25. Printhead according to claim 24, characterized in that said open base has a photosensitive area in the form of a rectangle with a larger side parallel to said first vertical direction and with a smaller side parallel to a second horizontal direction perpendicular to said first vertical direction.

26. Printhead according to claim 25, characterized in that said larger side has dimensions of between 100 and 500 $\mu$m and in that said smaller side has dimensions of between 10 and 200 $\mu$m.

27. Bubble ink jet printer comprising a fixed structure; a scanning carriage for supporting a plurality of printheads, which is movable with respect to said fixed structure in a first horizontal direction; and an electronic control unit having a function for timing said emission of ink droplets by said heads, characterized in that said printheads comprise a built-in opto-electronic position detector for detecting a first misalignment of said heads in said first horizontal direction and a second misalignment of said heads in a second vertical direction, substantially perpendicular with respect to said first horizontal direction; and in that said printer also comprises an illumination device integral with said fixed structure for producing a light spot focused on said built-in opto-electronic position detector.

28. Printer according to claim 27, characterized in that said timing is conditioned by said first misalignment detected by means of said built-in opto-electronic position detector.

29. Printer according to claim 27, characterized in that it also comprises means for performing vertical displacement of said heads and in that said displacement is conditioned by said second misalignment detected by means of said built-in opto-electronic position detector.

30. Printer according to claim 27, characterized in that said built-in opto-electronic position detector is of the four-quadrant type.

31. Printer according to claim 30, characterized in that said built-in optoelectronic position detector comprises four vertical phototransistors with an open base and common collector, each having an independent emitter.

32. Printer according to claim 29, characterized in that said means for performing said vertical displacement of said heads comprise a piezoelectric motor.

33. Printer according to claim 29, characterized in that said means for performing said vertical displacement of said heads comprise eccentric cams.

34. Printer according to claim 27, characterized in that said illumination device comprises a light generating device chosen from the group composed of laser diodes and light emitting diodes (LED's).

35. Printer according to claim 27, characterized in that said illumination device comprises a lens system for focusing said light spot on said built-in opto-electronic position detector.

* * * * *